United States Patent Office 3,088,801
Patented May 7, 1963

3,088,801
CHROMIUM AND BORON CONTAINING PRODUCT AND PROCESS FOR PRODUCING SAME
Alden Johnson Deyrup, West Chester, Pa., assignor to E. I. du Pont de Nemours and Company, Wilmington, Del., a corporation of Delaware
No Drawing. Filed June 22, 1961, Ser. No. 118,788
7 Claims. (Cl. 23—50)

This invention relates to new and useful chromium compounds and processes for the production thereof. More particularly, this invention relates to new chromium compounds in which chromium has a valence of two, which compounds, in the dry form, are stable when exposed to the atmosphere.

Very few chromium (II) compounds are stable in the air even when in the dry state. The great majority of them readily oxidize in the air to form chromium compounds of higher valence. It is, therefore, customary to prepare them as aqueous solutions, for use as needed, by electrolytic reduction or by zinc reduction of chromium (III) solutions. The former method is cumbersome and time-consuming, and the zinc reduction method places an equivalent amount of zinc ion in solution together with the desired chromium (II) ion. While suitable for some uses, such as reducing agents, these zinc-containing solutions are of no utility for chromium plating processes or other processes in which the zinc ion may interfere. The art is, therefore, in need of relatively pure chromium (II) compounds which are stable in the atmosphere and may be used generally as reagents, reducing agents and as chemicals for electroplating chromium from plating baths containing divalent chromium compounds.

It is an object of this invention to prepare chromium compounds that are suitable for use in preparing divalent chromium plating baths.

It is another object of this invention to prepare divalent chromium compounds that, in the dry state, are stable in the atmosphere.

Other objects of the invention will appear from the following detailed description of the invention.

The above objects may be accomplished by preparing chromium compounds having the general formula

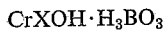

in which X designates chlorine, bromine or iodine.

These compounds may be prepared by mixing, in aqueous solution, a chromous halide (chloride, bromide or iodide) with boric acid and sufficient alkaline material to provide a pH of between about 2.5 and about 4.5.

If the pH of the solution is less than about 2.5, the desired $CrXOH \cdot H_3BO_3$ will not precipitate, and if the pH is greater than about 4.5 the resulting precipitated products, even in the dry state, will be unstable in air or actually pyrophoric when exposed to air.

Two particularly expedient methods have been developed for the production of the new chromium compositions of this invention. By one method, chromous halide is reacted in aqueous solution with boric acid in excess and sufficient borax to maintain the solution between a pH of about 2.5 and a pH of 4.5. By the other method, chromous halide is reacted in aqueous solution with boric acid and sufficient calcium carbonate to provide a pH of between about 2.5 and 4.5. The calcium carbonate, being of low solubility, does not make the solution alkaline, but is able, by Reaction 2 below, to dispose of the acid formed by Reaction 1, thus driving Reaction 1 forward to completion. By using a slight deficiency of calcium carbonate, it is all used up, and the calcium halide produced thereby can be washed away from the precipitated $CrXOH \cdot H_3BO_3$.

(1) $CrX_2 + H_3BO_3 + H_2O \rightleftharpoons CrXOH \cdot H_3BO_3 \downarrow + HX$
(2) $2HX + CaCO_3 \rightarrow CaX_2 + CO_2 \uparrow + H_2O$
(X=Cl, Br or I)

There are many other ways by which the reaction may be controlled to maintain the required pH value which will be obvious to one skilled in the art. The criteria of suitability of any method is the analytical quality of the product produced and more especially the resistance to oxidation by the atmosphere. The latter can readily be determined by weight gain upon exposure to air, for example, for 1–24 hours. Any preparation of these compounds should be carried out in the absence of air, for example under an inert gas such as nitrogen, carbon dioxide or other nonoxidizing gas. This is to prevent oxidation of chromium (II) compounds in solution. The washing and drying of the precipitate should also be done in the absence of air. After drying, the products of this invention are stable to ordinary exposure to the atmosphere.

The following examples are given to set forth, in detail, certain preferred processes for the production of the new compounds of this invention.

Example I

Seventeen hundred milliliters of a pure chromium (II) chloride solution containing 1 gram molecular weight of $CrCl_2$ was poured into a stirred flask containing ¼ gram molecular weight of borax $Na_2B_4O_7 \cdot 10H_2O$ and 1 gram molecular weight of boric acid. A light blue precipitate formed. After two hours' stirring, this was filtered off, washed and dried. In several preparations, the mother liquor or filtrate was found to be somewhat acidic, from pH 2.9 to pH 4. All these operations were carried out under nitrogen. After drying, the product remained blue and gained no weight when exposed to air for 24 hours. It was tetragonal crystalline, and neither pyrophoric nor combustible. It was very sparingly soluble in water. However, it dissolved in 0.5 molar sulfuric acid to form the very clear blue color of aquochromous ion. This solution showed the characteristic reducing power of chromium (II), such as reduction of cupric and silver salt solutions to the corresponding metals. A specimen of the compound reacted with aqueous acetic acid to form the characteristic red-brown solid chromium (II) acetate.

The compound was analyzed for percentage amounts of Cr, Cl, B and H and found to correspond closely to the calculated percentage amounts of these materials in the compound $CrClOH \cdot H_3BO_3$. The compound may be incorporated as the divalent chromium compound in a chromium plating bath of the kind described and claimed in my copending application Serial No. 33,951, filed June 6, 1960, now abandoned, to obtain satisfactory bright chromium deposits.

Example II

One liter of pure one molar chromium (II) chloride solution in water was poured into 500 ml. of water containing 0.57 gram molecular weight of calcium chloride $CaCl_2 \cdot 2H_2O$, 0.25 gram molecular weight of calcium carbonate $CaCO_3$ and 1.5 grams molecular weight of $H_3BO_3$. The mixture was heated to 50° C. and stirred until gas evolution stopped, and then was allowed to cool to room temperature and stirred for 16 hours. The pH of the mixture varied from 2.0 to 3.8 in several preparations. The product was filtered, washed thoroughly and dried. All operations were conducted under nitrogen until the product was dry. It was then found to be a clear light blue crystalline solid, completely stable in air.

Chemical analyses of the product revealed the following:

| Calc. for CrClOH·H₃BO₃, percent | Found, percent |
|---|---|
| Cr 31.27 | Cr 31.15, 30.84 |
| Cl 21.32 | Cl 20.85, 20.85 |
| B 6.51 | B 7.14, 6.88 |
| H 2.42 | H 2.66, 2.72 |
| Ca 0.00 | Ca 0.00 |

X-ray diffraction studies showed it to be tetragonal, with unit cell dimensions $A_0$ 6.31 A., $C_0$ 5.675 A. Density measurements in toluene yielded a figure of 2.43±0.03 g./cm.³. From this and the unit cell measurements a molecular weight of 331±3 was calculated for the unit cell. This corresponds to twice the formal weight for CrClOH·H₃BO₃.

Example III

One liter of water containing one gram mole of chromium (II) bromide, CrBr₂, was poured into 500 ml. of water containing 2 gram moles of boric acid, H₃BO₃, 0.2 gram mole of calcium carbonate, CaCO₃, and 3 gram moles of sodium bromide. The precipitate formed was washed and dried, all operations being performed in a nitrogen atmosphere. The dry light blue precipitate was stable in air as evidenced by lack of weight change when exposed to air for 24 hours. In this example the pH of the liquid mixture was 2.9. When ratios of reactants were changed to a higher alkalinity so that the pH of the reaction mixture was 4.8 to 5.5, the resulting dried products were either quite unstable, or actually pyrophoric, when exposed to air. The stable product of this example had the following percentage amounts of Cr, Br, B and H as compared to the calculated percentage amounts of these elements in CrBrOH·H₃BO₃:

| Element | Calculated, percent | Found, percent |
|---|---|---|
| Cr | 24.67 | 24.25 |
| Br | 37.92 | 37.59 |
| B | 5.11 | 5.63 |
| H | 1.91 | 2.09 |
| Cr valence | 2.00 | |

The dried precipitated product CrBrOH·H₃BO₃ prepared by this example is similar in appearance and most chemical reactions and practical chromium plating use to the compound CrClOH·H₃BO₃ prepared by Examples I and II above. Its X-ray powder diffraction pattern was, however, more complex.

Example IV

A procedure was carried out similar to that of Example III in all respects except that all bromine compounds were replaced by iodine compounds. The product was a similar light blue powder, fully stable in air, with similar chemical reactions and utility. The pH of the reaction mixture varied in different experiments from 3 to 4. Chemical analysis of the product indicated the presence of a compound CrIOH·H₃BO₃ as shown by the comparison of calculated and found percentages of Cr, I, B and H content as follows:

| Element | Calculated, percent | Found, percent |
|---|---|---|
| Cr | 20.17 | 20.08 |
| I | 49.20 | 40.24 |
| B | 4.19 | 6.25 |
| H | 1.56 | 1.90 |

In all of the above preparations, it is noted that the products are very similar in color, being a clear light blue. If the chromium (II) halides are not highly pure with regard to freedom from chromium (III) halides, or if any air gains access to the solutions during preparation, the products are discolored in the direction of green. This color change is extraordinarily sensitive to small amounts of chromium in the trivalent state. However, this color change does not appear to affect the air stability, nor the general utility of these compounds in any greater degree than would be expected from the amount of useful chromium (II) destructively oxidized to chromium (III).

The successful preparation of these compounds is not critical with regard to the ratio of chromium (II) halide to the boric acid, nor of the boric acid to the borax or calcium carbonate, providing the pH of the system is kept in the range specified. It is preferred to use an excess of chromium (II) halide and boric acid over the amount stoichiometrically required by the borax or calcium carbonate, in order to use up these alkaline materials with maximum precipitation of the desired product. Further additions of chromium (II) halide, boric acid and the alkaline material can be made to the mother liquor, so that more product is made and little or no material is wasted, despite the fact that the compounds CrXOH·H₃BO₃ are not entirely insoluble. In the reaction where borax is used, a stoichiometric excess is to be avoided because it would cause the system to become too alkaline. When calcium carbonate is used, such excess alkalinity is not caused, but the desired insoluble product would be contaminated with the excess of insoluble calcium carbonate, thereby becoming of lower purity. It is feasible to prepare the desired compounds at any ratio of reactants which will produce a practical amount of precipitate, and which will also not cause the pH to depart from the range specified.

Since the use of relatively pure chromium halide is desired in carrying out the process of this invention, a process for obtaining such pure halide is hereafter set forth as follows:

An excess of a good grade of commercial electrolytic chromium powder is placed in water, for example, 104 grams (2 moles) in 150 ml. of water. The reactor is purged with nitrogen. The water is heated to 90-100° C. and 2 moles of the hydrogen halide solution, preferably at a concentration of about 5.5 moles per liter, is admitted to the reactor with continuous stirring, slowly, to prevent excessive reaction speed, keeping the temperature at 90-100° C. After the addition is complete, the reactor is heated and stirred for several hours to complete the reaction. Then it is filtered in a nitrogen atmosphere to remove the excess of chromium metal as well as impurities such as iron. It may be used directly, or it may be evaporated in vacuo to dryness and then redissolved, if it is desired to get rid of traces of hydrogen selenide, sulfide and the like which originate from impurities in commercial pure chromium metal.

The following procedure is set forth to illustrate how the substitution of borax, Na₂B₄O₇·10H₂O, for boric acid plus borax, as shown in Example I, produces an entirely different and unsatisfactory chromium compound.

One liter of pure 1 molar chromium (II) chloride solution was poured into a flask containing ¼ mole (95 g.) of borax Na₂B₄O₇·10H₂O. A light blue precipitate formed. This was filtered, washed and dried, all steps being performed under nitrogen. The product was then exposed to air. It darkened rapidly, gave off steam, ignited itself to a dull red heat, and finally became olive green resembling chromium (III) oxide. This material, probably a borate, is entirely unsuitable as a source for chromium (II) because of its extreme air sensitivity.

Throughout the specification and claims, any reference to parts, proportions and percentages refers to parts, proportions and percentages by weight unless otherwise specified.

Since it is obvious that many changes and modifications

I claim:
1. As a new composition of matter $CrXOH \cdot H_3BO_3$ in which X designates a halide selected from the group consisting of chlorine, bromine and iodine.
2. As a new composition of matter $CrClOH \cdot H_3BO_3$.
3. As a new composition of matter $CrBrOH \cdot H_3BO_3$.
4. As a new composition of matter $CrIOH \cdot H_3BO_3$.
5. The process of preparing $CrXOH \cdot H_3BO_3$ in which X designates a halide selected from the group consisting of chloride, bromide and iodide, which comprises mixing a chromous halide with boric acid in an aqueous solution having a pH of between 2.5 and 4.5, and washing and drying the resulting precipitate, said steps being carried out with the substantial exclusion of air.
6. The process of preparing $CrXOH \cdot H_3BO_3$ in which X designates a halide selected from the group consisting of chloride, bromide and iodide, which comprises mixing in an aqueous solution, a chromous halide with boric acid and sufficient borax to maintain the solution at a pH of between 2.5 and 4.5, and washing and drying the resulting precipitate, said steps being carried out with the substantial exclusion of air.
7. The process of preparing $CrXOH \cdot H_3BO_3$ in which X designates a halide selected from the group consisting of chloride, bromide and iodide which comprises mixing in aqueous solution a chromous halide with boric acid and sufficient calcium carbonate to maintain the solution at a pH of between 2.5 and 4.5, and washing and drying the resulting precipitate, said steps being carried out with the substantial exclusion of air.

References Cited in the file of this patent

UNITED STATES PATENTS 2,607,658   Govett et al. _____ Apr. 19, 1952

OTHER REFERENCES

Mellor: Comprehensive Treatise on Inorganic and Theoretical Chemistry, Longmans, Green and Co., New York, 1924, vol. V, pages 107 and 108.